(12) United States Patent
Kakuta et al.

(10) Patent No.: US 7,713,396 B2
(45) Date of Patent: May 11, 2010

(54) METHOD AND APPARATUS FOR RECYCLING ELECTRODE MATERIAL OF LITHIUM SECONDARY BATTERY

(75) Inventors: Toshiya Kakuta, Nakano-ku (JP); Shingo Hirata, Shirai (JP); Tatsuhiro Higashi, Machida (JP); Seiichiro Yamazaki, Narita (JP)

(73) Assignees: Kawasaki Jukogyo Kabushiki Kaisha, Kobe (JP); Research Institute of Innovative Technology for the Earth, Kyoto (JP)

( * ) Notice: Subject to any disclaimer, the term of this patent is extended or adjusted under 35 U.S.C. 154(b) by 1342 days.

(21) Appl. No.: 11/175,308

(22) Filed: Jul. 7, 2005

(65) Prior Publication Data

US 2005/0241943 A1 Nov. 3, 2005

(51) Int. Cl.
*H01M 10/54* (2006.01)

(52) U.S. Cl. ............................ 205/59; 205/406; 205/407

(58) Field of Classification Search .................... 205/59, 205/406–407; 204/243.1–247.5
See application file for complete search history.

(56) References Cited

U.S. PATENT DOCUMENTS 6,447,669 B1 * 9/2002 Lain ........................... 205/705

FOREIGN PATENT DOCUMENTS

| JP | 10-158751 A | 6/1998 |
|----|-------------|--------|
| JP | 10-287864 A | 10/1998 |

* cited by examiner

*Primary Examiner*—Arun S Phasge
(74) *Attorney, Agent, or Firm*—Oliff & Berridge, PLC

(57) ABSTRACT

Lithium cobaltate forming the positive electrode of a lithium secondary battery is subjected together with lithium metal to reducing reaction in molten lithium chloride to produce lithium oxide and to precipitate and separate cobalt or cobalt oxide. The lithium oxide is subjected to electro-deposition in molten lithium chloride contained in a lithium electro-deposition tank provided with an anode and a cathode to recover lithium metal deposited on the cathode.

9 Claims, 3 Drawing Sheets

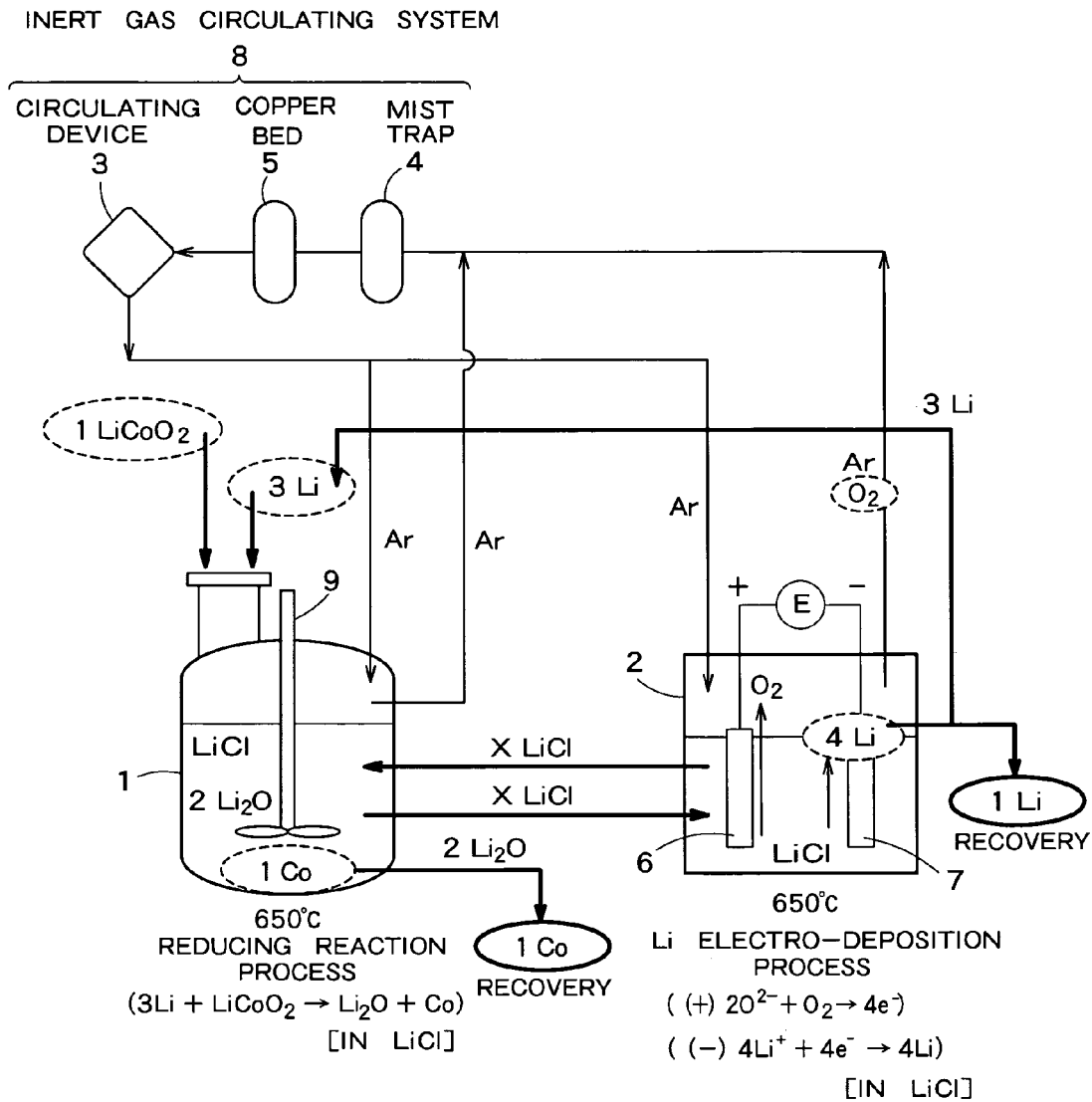
F I G. 2

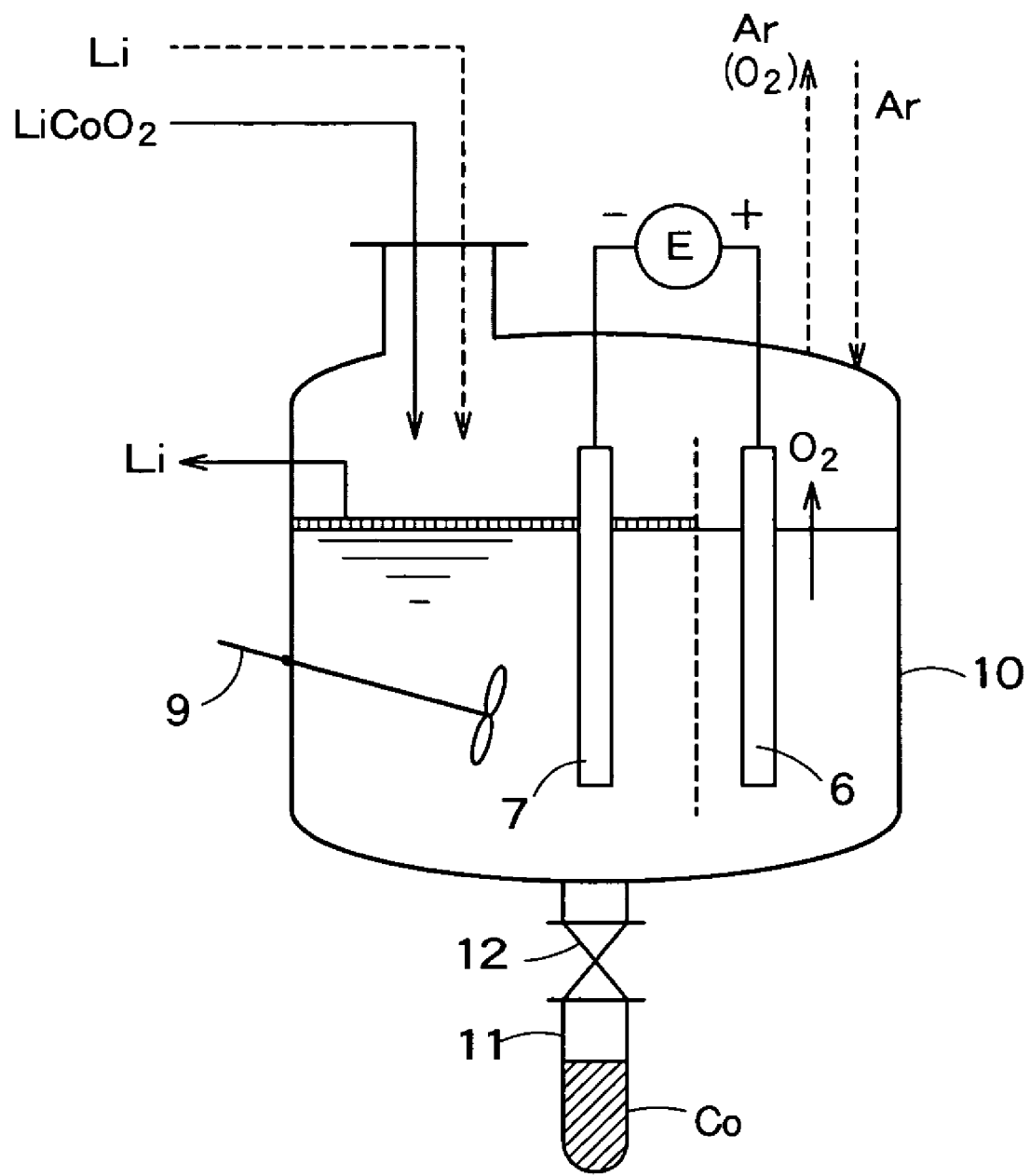
F I G. 3

METHOD AND APPARATUS FOR RECYCLING ELECTRODE MATERIAL OF LITHIUM SECONDARY BATTERY

CROSS REFERENCE TO RELATED APPLICATIONS

This application is based upon the prior Japanese Patent Application No. 2003-175038 filed on Jun. 19, 2003, the entire contents of which are incorporated herein by reference.

BACKGROUND OF THE INVENTION

1. Field of the Invention

The present invention relates to a valuable metal recycling method and apparatus for recovering valuable metals from an electrode material of a lithium secondary battery.

2. Description of Related Art

The positive electrode of a lithium secondary battery is formed of a lithium-containing transition metal oxide, more specifically, of a composite material containing lithium cobaltate ($LiCoO_2$) comparatively easily produced by synthesis and carbon. The composite material contains Co and Li, which are valuable rare metals. Therefore it is desired to recover Co and Li from the composite material forming the positive electrode of the lithium secondary battery by a recycling process to use the recovered Co and Li for forming electrodes, etc.

A conventional valuable metal recycling method of recovering valuable materials from the material of the positive electrode by a wet process recovers a cobalt compound and the like by a plurality of oxide processing steps.

A recycling process is disclosed in JP-A 10-158751. This known recycling process includes the steps of roasting used lithium secondary batteries, reducing the roasted materials of used lithium secondary batteries with carbon to produce materials that can be easily converted into metal condensates, such as metallic cobalt particles and metallic nickel particles, crushing the roasted materials into particles, sifting the particles to classify the particles into rich particles rich in valuable metals and lean particles lean in valuable metals, mixing the rich particles having a high valuable metal content and a calcium compound to prepare a mixture, melting the mixture by heating at 1500° C. or above, and removing Al from a molten mixture by adding a calcium compound into the molten mixture to obtain valuable metals, such as Co and Li.

A valuable metal recovering process disclosed in JP-A 10-287864 includes the steps of immersing active materials forming the positive electrodes of lithium secondary batteries in a mineral acid, such as sulfuric acid, or a mixed solution of a mineral acid and hydrogen peroxide to produce an eluate, mixing the eluate in a solvent containing a special metal extractant, such as a bis(1,1,3,3-tetra-methylbutyl)phosphoric acid compound for catalytic extraction fractionation, and mixing an extract solution in a mineral acid for back extraction to recover valuable metals.

Those known oxide processing methods include many processes including an acid dissolution process, a solvent extraction process, a deposition process, an acid treatment and a heat treatment and need a longtime to complete the methods. A burning process for removing carbon needs a large quantity of energy and takes a long time on the order of 2 hr. Moreover, the conventional method is unable to recover lithium efficiently. Furthermore, to process an electrode material containing other valuable rare metals, other processing methods suitable for processing such an electrode material are necessary.

SUMMARY OF THE INVENTION

Accordingly, it is an object of the present invention to provide method and apparatus for recycling an electrode material of a lithium secondary battery by simple processes capable of being carried out in a short time. More particularly, it is an object of the present invention to provide method and apparatus for recovering lithium from a material of a positive electrode of a lithium secondary battery.

In order to solve the above-mentioned problems, a method of recycling an electrode material of a lithium secondary battery, includes: subjecting a lithium cobaltate contained in the electrode material forming a positive electrode of the lithium secondary battery together with a lithium metal to a reducing reaction in a molten lithium chloride to produce a lithium oxide and separate a cobalt or a cobalt oxide by a precipitation; and subjecting the lithium oxide to an electrolysis in a molten lithium chloride so as to deposit a lithium metal on a cathode for recovering the lithium metal.

The method of the present invention adds lithium metal to lithium cobaltate contained in a material forming the electrode of a lithium secondary battery and decomposes lithium cobaltate into cobalt ingredient and lithium ingredient by utilizing the strong catalytic action in chemical reaction of molten lithium chloride having a melting point of 610° C. and heated at about 650° C. through the following reducing reactions.

$$LiCoO_2 + Li \rightarrow CoO + Li_2O \quad (1)$$

$$CoO + 2Li \rightarrow Co + Li_2O \quad (2)$$

Valuable metals including cobalt and excluding lithium precipitate in the molten salt as metal oxides or metals. Lithium oxide does not precipitate and remains melted in the molten salt. Therefore, when an anode and a cathode are immersed in the molten salt for electrolysis, lithium metal deposits on the cathode. Since molten lithium metal floats on the surface of the molten salt, the molten lithium metal can be recovered by spilling the molten lithium metal from a tank or sucking the molten lithium metal. A space extending over the molten salt is filled with an inert gas, such as argon gas, to prevent the oxidation of highly reactive lithium metal.

A conventional preparatory process heats the composite material at 1100° C. or above to remove carbon by burning. Carbon can be oxidized by another preparatory process that immerses crushed electrode material directly in the molten salt and blows air or oxygen into the molten salt for bubbling to oxidize carbon. Carbon dioxide produced through the oxidation of carbon diffuses and is absorbed by a carbon dioxide absorbent placed in a sealing gas circulating line. Oxygen produced around the anode during the electrolytic decomposition of lithium oxide is carried away by the sealing gas and is removed by a copper oxide bed placed in the sealing gas circulating line.

Cobalt can be precipitated and separated by adding at least three molecules of lithium metal to one molecule of lithium cobaltate for reducing reaction. Reactions expressed by the reaction formulas (1) and (2) proceed at high reaction rates. Cobalt oxide, namely, an intermediate product can be readily reduced to cobalt by the addition of lithium so that cobalt precipitates on the bottom of the tank. Cobalt metal is a valuable metal for producing various materials.

Cobalt may be recovered in cobalt oxide when the material forming the positive electrode is recycled to use the same for forming the positive electrode. Therefore, molecules of lithium equal to that of lithium cobaltate may be added to effect only the reaction formula (1). Whereas cobalt oxide is nonmagnetic, cobalt metal is magnetic. Therefore, cobalt metal can be separated from cobalt oxide by using a magnet even if both cobalt metal and cobalt oxide are produced.

Preferably, a voltage for electrolysis is in the range of 2.47 to 3.46 V. Decomposition of lithium oxide starts when the potential difference between the electrodes is 2.472 V at a processing temperature of 650° C. Since decomposition of a large amount of lithium chloride serving as a solvent starts at 3.459 V, it is preferable to electrolyze lithium oxide selectively by using a voltage in the aforesaid range for electrolysis. Part of lithium metal recovered by electro-deposition can be used as a reducing agent for the reducing reaction for reducing lithium cobaltate.

The recycling method of the present invention for recovering lithium from lithium cobaltate is able to surely recover lithium, which has been difficult to recover, in addition to cobalt. The dry reaction process using molten lithium chloride is simple, and the reducing reaction occurs uniformly and stably. Waste water and wastes can be easily processed.

In order to solve the above-mentioned problems, an apparatus for recycling an electrode material of a lithium secondary battery, includes: a reducing reaction tank; and a lithium electro-deposition tank in which a liquid processed in the reducing reaction tank is processed. The reducing reaction tank is configured to receive a lithium cobaltate contained in the electrode material forming a positive electrode of the lithium secondary battery into a molten lithium chloride contained in the reducing reaction tank, a lithium metal being added to the molten lithium chloride in the reducing reaction tank, the molten lithium chloride being stirred to produce a lithium oxide and separate a cobalt or a cobalt oxide by a precipitation. The electro-deposition tank is configured to receive the liquid processed by the reducing reaction in the reducing reaction tank so that the liquid is subjected to an electrolysis to deposit a lithium metal on a cathode and recover the lithium metal.

The ratio between the quantity of cobalt precipitated on the bottom of the reducing reaction tank and that of cobalt oxide can be adjusted by adjusting the quantity of lithium to be added. Cobalt can be separated from cobalt oxide by using a magnet or an electromagnet.

Preferably, the potential difference between electrodes placed in the electro-deposition tank is adjusted so that lithium chloride may not be decomposed.

The recycling apparatus of the present invention for recovering lithium from lithium cobaltate is provided with a sealing gas circulating system for circulating a sealing gas, such as an argon gas circulating system. Basically, oxygen gas is only the waste produced in the electro-deposition tank. The argon circulating system is provided with copper bed to remove oxygen produced in the electro-deposition tank. Since argon gas carries mist of the molten salt, the argon gas circulating system is provided with a mist trap for removing mist of the molten salt.

Carbon dioxide gas is produced when carbon is burned in the reducing reaction tank for pretreatment. Therefore, it is preferable to provide the argon gas circulating system with a carbon dioxide absorbent to remove carbon dioxide gas from argon gas. Carbon dioxide gas can be solidified and removed by a cold trap.

The recycling apparatus of the present invention for recovering lithium is simple in construction, is compact and is capable of operating at a low operating cost.

Part of lithium metal recovered by electro-deposition in the electro-deposition tank can be used as a reducing agent for the reducing reaction.

Electrodes for electrolysis may be placed in the reducing reaction tank to use the reducing reaction tank also as the electro-deposition tank. The respective temperatures of the molten lithium chloride for the reducing reaction and the molten lithium chloride for the electro-deposition are substantially equal to each other. Therefore, equipment cost can be saved and energy loss resulting from heating and cooling can be reduced by successively carrying out the reducing reaction and the electro-deposition in the same tank. The reducing reaction can be automatically continued by leaving lithium metal produced by electro-deposition in the tank, which saves equipment cost and operating cost.

BRIEF DESCRIPTION OF THE DRAWINGS

The above and other objects, features and advantages of the present invention will become more apparent from the following description taken in connection with the accompanying drawings, in which:

FIG. 2 is a block diagram of an apparatus for recycling an electrode material of a lithium secondary battery in a preferred embodiment according to the present invention; and FIG. 3 is a schematic view of a reaction tank included in a single tank type recycling apparatus in a preferred embodiment according to the present invention.

DESCRIPTION OF THE PREFERRED EMBODIMENTS

Figure 1:
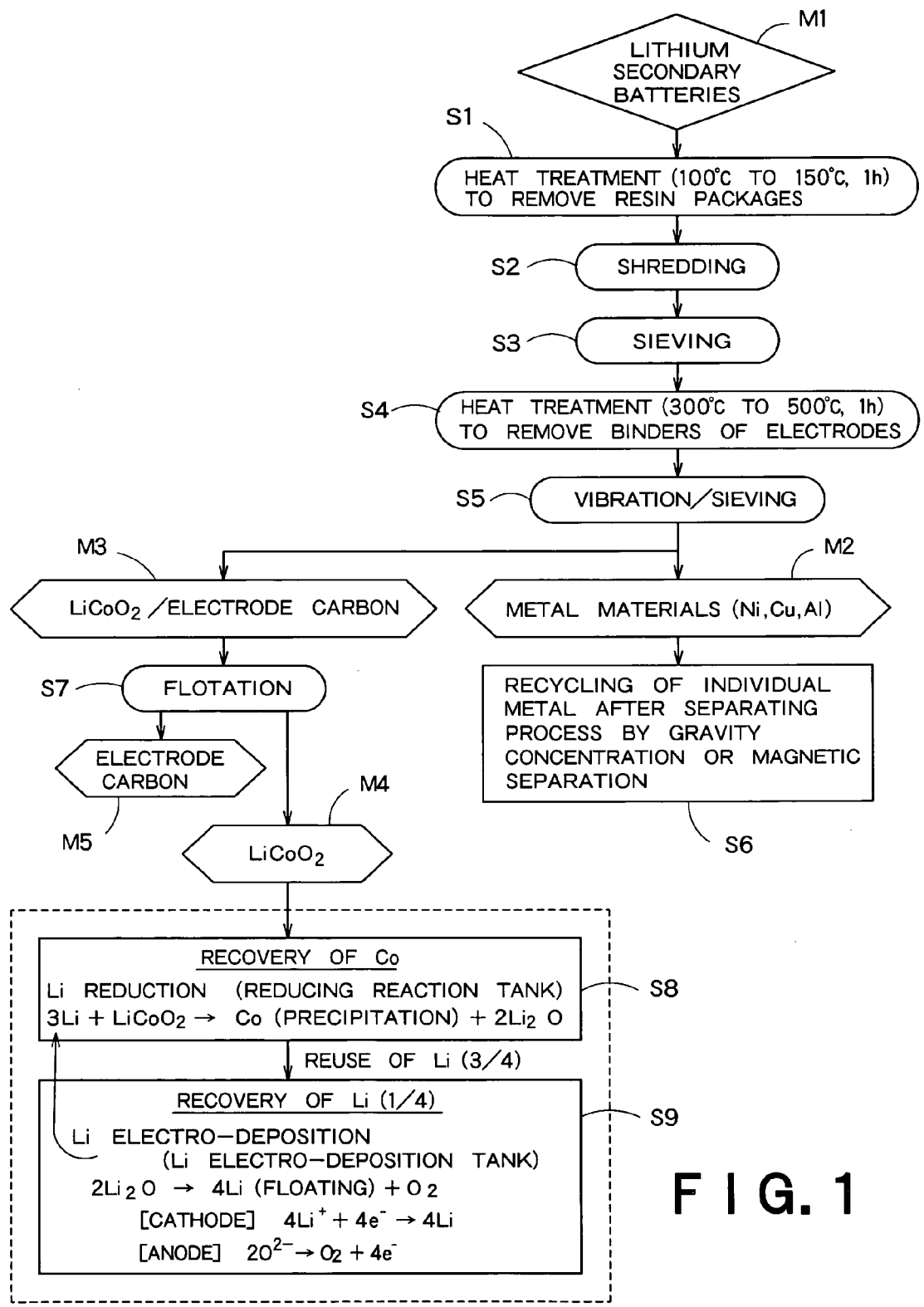
FIG. 1 is a flow chart of a method of recycling an electrode material of a lithium secondary battery in a preferred embodiment according to the present invention.

Referring to FIG. 1, a method of recycling an electrode material of a lithium secondary battery in a preferred embodiment according to the present invention for recovering valuable metals from the material of the electrode of a lithium secondary battery heats collected lithium ion batteries M1 at a comparatively low temperature in the range of 100° C. to 150° C. for about 1 hr to remove resin packages in step S1 as a preparatory process. Then the thus heated lithium ion batteries are shredded into shreds in step S2. The shreds are sieved to sieve out small particles in step S3. Then the sieved out small particles are heated at a comparative high temperature in the range of 300° C. to 500° C. for about 1 hr to remove a binder used for forming electrodes in step S4. Then they are sieved by a vibrating sieve in step S5 to sort the heated particles into metals M2, such as nickel, copper and aluminum, and a mixture M3 of lithium cobaltate ($LiCoO_2$) and electrode carbon C.

The metals M2 are subjected to gravity concentration or magnetic separation to separate the metals and to collect the metals individually in step S6. The metals thus sorted are recycled effectively. The mixture M3 of lithium cobaltate and carbon is subjected to flotation in step S7 to sort the mixture M3 into lithium cobaltate M4 and electrode carbon M5. Lithium cobaltate M4 is divided into lithium metal and a cobalt composition by the valuable metal recycling method embodying the present invention. Lithium metal and the cobalt composition are used as a material of electrodes and those for suitable purposes.

The valuable metal recycling method in a preferred embodiment according to the present invention includes two steps S8 and S9, namely, a reducing reaction step and a lithium electro-deposition step. A valuable metal recycling apparatus shown in FIG. 2 executes the valuable metal recycling method of the present invention. The valuable metal recycling apparatus includes a reducing reaction tank 1, a lithium electro-deposition tank 2 and peripheral devices. Lithium chloride (LiCl) contained in the reducing reaction tank 1 is heated at a temperature slightly higher than the melting point of lithium chloride to melt the same.

When lithium cobaltate and carbon cannot be satisfactorily separated, or flotation in step S7 is omitted, lithium cobaltate contained in the reducing reaction tank 1 is stirred by a stirring device 9 as oxygen gas ($O_2$) is blown into lithium cobaltate to convert carbon (C) into carbon dioxide gas ($CO_2$) so that carbon dioxide gas is diffused. This reducing reaction may be performed in an atmosphere of the atmospheric pressure. Oxygen gas is blown into lithium cobaltate together with an inert gas, such as argon gas (Ar) or nitrogen gas ($N_2$). Air may be blown into lithium cobaltate instead of a mixture of an inert gas and oxygen gas.

Carbon dioxide gas and oxygen gas are carried away by a sealing gas, such as argon gas. The reducing reaction tank 1 is sealed by an inert gas and is heated at about 650° C. which is higher than the melting point of lithium cobaltate. Then lithium metal (Li) is added to lithium cobaltate and the mixture of lithium metal and lithium cobaltate is stirred by the stirring device 9 to promote a reducing reaction.

A lithium reducing reaction expressed by a reaction formula (3) to be executed in step S8 shown in FIG. 1 is performed by mixing lithium cobaltate and lithium metal of which the quantity is three times the equivalent of lithium cobaltate.

$$LiCoO_2 + 3Li \rightarrow Co + 2Li_2O \qquad (3)$$

This reducing reaction produces cobalt and lithium oxide. Although lithium floats on the surface of the molten lithium chloride, the molten lithium chloride heated at 650° C. contains about 0.1% by weight dissolved lithium. The foregoing chemical reaction consumes dissolved lithium and the reducing reaction tank 1 is replenished with the lithium metal floating on the surface of the molten salt. Consequently, the chemical reaction continues until the lithium cobaltate or the lithium metal is exhausted.

The cobalt thus produced does not dissolve easily in the lithium chloride and precipitates on the bottom of the reducing reaction tank 1. Thus cobalt can be easily separated from the lithium chloride.

Since the lithium oxide dissolves in the lithium chloride heated at 650° C. in a lithium oxide concentration of about 8.8% by weight. The quantity of lithium cobaltate that can be processed in a batch is restricted by lithium oxide concentration and is dependent on the quantity of molten lithium chloride and the dissolution rate of lithium oxide. When lithium chloride is substantially saturated with lithium oxide, the molten lithium chloride saturated with lithium oxide is poured into the lithium electro-deposition tank 2.

The molten lithium chloride may be kept at a high temperature during transportation to the lithium electro-deposition tank 2 and the precipitated cobalt may be extracted. Although cobalt in a solid phase can be separated from a liquid phase, cobalt can be separated from a liquid phase by a magnet. If the recovered cobalt is used as a material for forming electrodes, it is advantageous in view of processing cobalt, in some cases, to recover cobalt in cobalt oxide.

When it is desired to obtain cobalt oxide, lithium metal having a quantity substantially corresponding to one equivalent of lithium cobaltate is added to lithium cobaltate.

$$LiCoO_2 + Li \rightarrow CoO + Li_2O \qquad (4)$$

Thus lithium oxide and cobalt oxide can be produced through the reducing reaction expressed by the reaction formula (4).

Cobalt oxide can be easily recovered because cobalt oxide does not dissolve in the molten lithium chloride and precipitates. Since cobalt oxide is nonmagnetic while cobalt metal is magnetic, cobalt metal and cobalt oxide can be individually recovered from a precipitating cobalt composition or a precipitated cobalt composition even in a case where the quantity of lithium metal corresponds to one to three times the equivalent of the lithium cobaltate.

The lithium electro-deposition tank 2 is provided with electrodes, namely, an anode 6 and a cathode 7. The electrodes are connected to a dc power supply. The molten lithium chloride containing the lithium oxide produced in the reducing reaction tank 1 is poured into the lithium electro-deposition tank 2. The electrodes are immersed in the molten lithium chloride and a voltage in the range of 2.47 to 3.46 V is applied across the electrodes to electrolyze the lithium oxide. Thus lithium is deposited on the cathode 7 and oxygen gas is generated around the anode 6 in step S9. Molten lithium metal deposited on the cathode 7 floats on the surface of the molten lithium chloride. The oxygen gas generated in the lithium electro-deposition tank 2 is carried away by the sealing gas.

The lithium oxide is decomposed into lithium and oxygen gas when the voltage applied across the electrodes is 2.47 V or above. The decomposition of the lithium chloride starts and the generation of chloride gas starts when the voltage applied across the electrodes is 3.46 V or above. Therefore, the unnecessary generation of chloride gas can be suppressed and the selective decomposition of the lithium oxide can be promoted by adjusting the voltage applied across the electrodes to a voltage between about 2.47 and 3.46 V.

When the thus produced lithium metal is used for the reducing reaction, about ¾ of the lithium metal is returned to the reducing reaction tank 1 in the step of recovering cobalt metal and ¼ of the lithium metal is recovered. The efficiency of lithium electro-deposition is low when the lithium oxide concentration of the molten lithium chloride is too low. Therefore, lithium electro-deposition is stopped upon the decrease of the lithium oxide concentration to a certain level, the residual molten salt is returned to the reducing reaction tank 1, lithium cobaltate is again added to the molten salt and lithium metal also is added, and the reducing reaction is performed again.

Lithium metal reacts with oxygen and nitrogen contained in the atmosphere. Therefore, the electro-deposition of lithium metal is performed in an atmosphere of an inert gas, such as argon gas. A circulating device 3 included in an inert gas circulating system 8 circulates the inert gas. The inert gas circulating system 8 is provided with a mist trap 4 for removing a mist of the molten salt contained in the inert gas, and a copper bed 5 for removing oxygen gas generated in the lithium electro-deposition tank 2.

Basically, the oxygen gas generated in the lithium electro-deposition tank 2 is only the waste produced by the valuable metal recycling method in this embodiment. Whereas the conventional valuable metal recycling method by a wet process produces much waste including waste water, an ion-exchange resin and an organic solvent, the valuable metal recycling method of the present invention produces only a small amount of few kinds of waste, which is an advantage of the present invention. Basically, the valuable metal recycling method of the present invention includes only the two processes, namely, the reducing reaction process and the electro-deposition process. Therefore, the valuable metal recycling method can be carried out by a compact valuable metal recycling apparatus, while the conventional valuable metal recycling method by a wet process includes many cascaded processes. The conventional valuable metal recycling method by a wet process needs to limit the quantity of work to be processed to prevent the runaway of the reducing reaction. In the valuable metal recycling method of the present invention, heat generated by the reducing reaction can be satisfactorily absorbed by the molten salt even though the reducing reaction proceeds at a high reaction rate because the molten salt has a large heat capacity. Therefore, a large quantity of work can be processed.

The valuable metal recycling method of the present invention is able to recover valuable metals from the electrode material of the lithium secondary battery by dry processes owing to the foregoing advantages. Since the processes are simple and can be completed in a short time, the valuable metal recycling apparatus can be formed in compact construction and can operate at a low operating cost. The quantities of waste water and wastes can be reduced.

As shown in FIG. 3, a single tank 10 may be used for both the reducing reaction tank 1 and the lithium electro-deposition tank 2. Namely, a reducing reaction tank 10 provided with electrodes 6, 7 can be used for both reducing reduction and electro-deposition. When the reducing reaction process and the electro-deposition process are carried out in the single tank 10, a carrying device for carrying the liquid can be omitted and energy for maintaining the molten salt at a desired temperature can be saved because the drop of the temperature of the molten salt while the molten salt is being carried can be avoided. Since the lithium metal produced by electro-deposition can be directly used for the reducing reaction, any devices for sucking up the lithium metal and dispensing the lithium metal to a reducing reaction tank are not needed. Precipitated cobalt or cobalt oxide can be easily recovered by collecting precipitated cobalt or cobalt oxide in a sump 11 formed in the bottom of the tank 10 and by opening a valve 12 connected to the sump 11 to discharge the precipitated cobalt or cobalt oxide.

A mixture of lithium cobaltate particles ($LiCoO_2$ particles) of 10 μm in particle size and lithium was subjected to a reducing reaction to prove the practical utility of the present invention. Cobalt (Co) was produced when the mixture contained lithium cobaltate and lithium metal of three times equivalent of lithium cobaltate. Cobalt oxide (CoO) was produced when the mixture contained lithium cobaltate and lithium metal of one equivalent of lithium cobaltate. When 3.0 V was applied across the electrodes of the lithium electro-deposition tank containing molten lithium chloride having a cobalt oxide concentration of 5% by mol, a quantity of lithium metal substantially equal to a theoretical quantity could obtained.

As apparent from the foregoing description, the valuable metal recycling method according to the present invention and the valuable metal recycling apparatus for carrying out the method can efficiently recover rare valuable metals, particularly, lithium and cobalt, from the material of the electrode of the lithium secondary battery basically by the two simple processes, namely, the reducing reaction process and the electro-deposition process, in a short time. Thus the present invention simplifies the valuable metal recycling apparatus and reduces the operating cost.

What is claimed is:

1. A method of recycling an electrode material of a lithium secondary battery, comprising:

subjecting a lithium cobaltate contained in the electrode material of a positive electrode of the lithium secondary battery together with a lithium metal to a reducing reaction in a molten lithium chloride to produce a lithium oxide and separate a cobalt or a cobalt oxide by a precipitation; and subjecting the lithium oxide to an electrolysis in a molten lithium chloride so as to deposit a lithium metal on a cathode for recovering the lithium metal.

2. The recycling method according to claim 1, wherein the lithium metal having a quantity at least three times a quantity of the lithium cobaltate contained in the electrode material forming the positive electrode is added for the reducing reaction to precipitate and separate mainly the cobalt.

3. The recycling method according to claim 1, wherein the lithium metal having a quantity equal to a quantity of the lithium cobaltate contained in the electrode material forming the positive electrode is added for the reducing reaction to precipitate and separate mainly the cobalt oxide.

4. The recycling method according to claim 1, wherein a voltage for the electrolysis is in a range of 2.47 to 3.46 V.

5. An apparatus for recycling an electrode material of a lithium secondary battery, comprising:

a reducing reaction tank; and a lithium electro-deposition tank in which a liquid processed in the reducing reaction tank is processed;

wherein the reducing reaction tank is configured to receive a lithium cobaltate contained in the electrode material of a positive electrode of the lithium secondary battery into a molten lithium chloride contained in the reducing reaction tank, a lithium metal being added to the molten lithium chloride in the reducing reaction tank, the molten lithium chloride being stirred to produce a lithium oxide and separate a cobalt or a cobalt oxide by a precipitation, wherein the electro-deposition tank is configured to receive the liquid processed by the reducing reaction in the reducing reaction tank so that the liquid is subjected to an electrolysis to deposit a lithium metal on a cathode and recover the lithium metal.

6. The recycling apparatus according to claim 5, wherein the lithium metal having a quantity at least three times a quantity of the lithium cobaltate contained in the electrode material of the positive electrode is added in the reducing reaction tank for the reducing reaction to precipitate and separate mainly the cobalt.

7. The recycling apparatus according to claim 5, wherein the lithium metal having a quantity equal to a quantity of the lithium cobaltate contained in the electrode material of the positive electrode is added in the reducing reaction tank to precipitate and separate mainly the cobalt oxide.

8. The recycling apparatus according to claim 5, wherein a voltage for the electrolysis in the lithium electro-deposition tank is in a range of 2.47 to 3.46 V.

9. The recycling apparatus according to claim 5, wherein the reducing reaction tank also functions as the lithium electro-deposition tank so that an electro-deposition of lithium can be carried out without carrying the liquid in the reducing reaction tank after the reducing reaction.

* * * * *